(12) United States Patent
Kaneko

(10) Patent No.: US 11,823,294 B1
(45) Date of Patent: Nov. 21, 2023

(54) SITE MANAGEMENT APPARATUS AND MANAGEMENT METHOD

(71) Applicant: Hitachi, Ltd., Tokyo (JP)

(72) Inventor: Satoshi Kaneko, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/112,060

(22) Filed: Feb. 21, 2023

(30) Foreign Application Priority Data

Nov. 7, 2022 (JP) ................................ 2022-178440

(51) Int. Cl.
*G06Q 50/06* (2012.01)
*G06Q 10/0631* (2023.01)
*G06Q 10/04* (2023.01)

(52) U.S. Cl.
CPC ............. *G06Q 50/06* (2013.01); *G06Q 10/04* (2013.01); *G06Q 10/06315* (2013.01)

(58) Field of Classification Search
CPC ... G06Q 50/06; G06Q 10/04; G06Q 10/06315
See application file for complete search history.

(56) References Cited

U.S. PATENT DOCUMENTS

2011/0282982 A1 11/2011 Jain
2019/0372348 A1* 12/2019 Miyake ..................... H02J 3/46

\* cited by examiner

*Primary Examiner* — Tejal Gami
(74) *Attorney, Agent, or Firm* — MATTINGLY & MALUR, PC

(57) ABSTRACT

There is provided a site management apparatus capable of achieving both the improvement of the utilization rate of renewable energy and the reduction of the overhead of power consumption. A processor calculates, based on a site energy management table, an adjustment amount for adjusting a demand amount consumed at a migration source site of a workload. The processor selects, based on the adjustment amount and workload management information, a migration target workload, which is a workload whose execution site is to be migrated to a migration destination site, from among workloads executed in the migration source site and generates migration plan information indicating the selected migration target workload.

9 Claims, 8 Drawing Sheets

FIG. 3

| | Site Id | Time | RE Supply Forecast | RE Supply Result | RE Price Forecast | Grid Price Forecast | Power Demand Forecast | Power Consumption Result |
|---|---|---|---|---|---|---|---|---|
| 241A | 01 | 2018/4/1 10:00 | 3.0 | 2.5 | 30.0 | 25.0 | 10.1 | 10.9 |
| 241B | 01 | 2018/4/1 11:00 | 5.3 | 4.0 | 22.1 | 25.1 | 7.8 | 6.5 |
| 241C | 01 | 2018/4/1 12:00 | 10.2 | n/a | 15.0 | 25.1 | 6.3 | n/a |
| 241D | 01 | 2018/4/1 13:00 | 9.1 | n/a | 15.0 | 25.0 | 9.6 | n/a |
| | ... | ... | ... | ... | ... | ... | ... | ... |

Column headers: 2411, 2412, 2413, 2414, 2415, 2416, 2417, 2418

2410 Site Energy Management Table

FIG. 4

| Policy ID (2421) | Site ID (2422) | Migration (2423) |
|---|---|---|
| 01 | 01, 02 | True |
| 02 | 01, 02, 03 | True |
| 03 | 01 | False |
| 04 | 01, 02 | False |
| 06 | 02 | False |
| ... | ... | |

242A, 242B, 242C, 242D, 242E

2420 Placement Policy Table

FIG. 5

| | App ID (2431) | Site ID (2432) | Estimated Power Consumption (2433) | Storage Configuration (2434) | Creation Time (2435) | Placement Policy (2436) |
|---|---|---|---|---|---|---|
| 243A | 01 | 01 | 40 | No Volume | 2018/4/1 10:00 | 01 |
| 243B | 02 | 01 | 500 | Allocated and Copied for Migration | 2018/3/31 11:00 | 01 |
| 243C | 03 | 01 | 50 | Allocated and Copied for DR | 2018/4/1 12:00 | 02 |
| 243D | 04 | 05 | 50 | Allocated | 2018/2/1 13:00 | 10 |
| | : | : | : | : | : | |

2430 Application Management Table

FIG. 6

| | Volume ID | App ID | Copy Flag | Copy Pair ID | Type | Capacity | Used Capacity | Device Type | Site ID |
|---|---|---|---|---|---|---|---|---|---|
| 244A | 01 | 02 | True | 01 | Primary | 500GB | 110GB | A | 01 |
| 244B | 02 | 02 | True | 01 | Secondary | 500GB | 110GB | A | 02 |
| 244C | 03 | 03 | Ture | 02 | Primary | 1000GB | 1000GB | C | 01 |
| 244D | 04 | 03 | Ture | 02 | Secondary | 1000GB | 1000GB | C | 01 |
| 244E | 05 | 04 | False | n/a | n/a | 500GB | 500GB | A | 04 |
| | | | | | | | | | |
| | | | | | | | | | |
| | ⋮ | ⋮ | ⋮ | | ⋮ | ⋮ | | | |

2440 Storage Management Table

SITE MANAGEMENT APPARATUS AND MANAGEMENT METHOD

CROSS-REFERENCE TO PRIOR APPLICATION

This application relates to and claims the benefit of priority from Japanese Patent Application No. 2022-178440 filed on Nov. 7, 2022 the entire disclosure of which is incorporated herein by reference.

BACKGROUND

The present disclosure relates to a site management apparatus and a management method.

As a countermeasure against climate change, use of renewable energy is advancing. Conventionally, renewable energy has commonly been obtained by purchasing a certificate such as a non-fossil certificate. However, in recent years, with an increase in the distribution amount of renewable energy, there is an increasing number of electric power companies that directly purchase renewable energy from power generation companies through a PPA (Power Purchase Agreement) or the like and acquire environmental values through certificate transfer associated with the purchase. A similar tendency applies to consumers who consume a large amount of electric power, and electric power procurement through the PPA is widespread among data centers (DC: Data Centers), which are large consumers of electric power, mainly in Europe and the United States. In addition, with a view to improving the utilization rate of renewable energy in the entire society in the future, advanced electric power companies in Europe and the United States are making efforts to improve the utilization rate of renewable energy on an hourly basis, rather than improving the utilization rate of renewable energy on an annual basis, which is currently the mainstream.

As for DCs, which are large consumers, since a large amount of power is needed throughout the day, efficient use of renewable energy, which is unstable and has geographical constraints, is an issue. Accordingly, attention has been paid to a technique for selecting a DC that executes a workload (WL: Workload) from among a plurality of DCs provided at different locations based on the area and time of day at which renewable energy is abundant.

For example, U.S. Patent Application Publication No. 2011/0282982 (Specification) discloses a technique for relocating an application to any one of a plurality of hosting sites based on a supply amount of electric power (including electric power generated by renewable energy), a cost, and an available amount of computing resources in each of the plurality of hosting sites.

SUMMARY

When an application is relocated, data used by the application needs to be copied to the same location as the application, and a down time of several seconds to several minutes occurs due to the copying of the data and the switching processing of the application. This down time causes an overhead of power consumption to occur. However, the technique described in U.S. Patent Application Publication No. 2011/0282982 (Specification) does not consider the power consumption accompanying the relocation of the application. Consequently, there is a possibility that the overhead of power consumption becomes excessive.

An object of the present invention is to provide a site management apparatus and a management method capable of achieving both the improvement of the utilization rate of renewable energy and the reduction of the overhead of power consumption.

A site management apparatus according to one aspect of the present disclosure manages a plurality of sites each capable of storing data and executing a workload using the data, the site management apparatus including: a processor; and a memory, wherein the memory stores energy management information that indicates, for each site, a forecast value of a supply amount, which is an amount of power generated by renewable energy and supplied to the site, and a forecast value of a demand amount, which is an amount of power consumed at the site, and workload management information that indicates, for each workload, a power consumption amount, which is an amount of power consumed by the workload, data management information related to the data used by the workload, and an execution site, which is the site at which the workload is executed, and wherein the processor calculates, based on the energy management information, an adjustment amount for adjusting the demand amount consumed at a first site by migrating the execution site from the first site to a second site, selects, based on the adjustment amount and the workload management information, a migration target workload, which is a workload whose execution site is to be migrated to the second site, from among workloads executed in the first site, and generates migration plan information indicating the migration target workload.

According to the present invention, it is possible to improve the utilization rate of renewable energy and reduce overhead of power consumption at the same time. As a result, it is possible to reduce the power consumption in workload control in consideration of renewable energy for the purpose of reducing the $CO_2$ emission amount and reduce the application exhibiting deterioration in service level.

BRIEF DESCRIPTION OF THE DRAWINGS

FIG. 3 is a diagram illustrating an example of a site energy management table;

FIG. 4 is a diagram illustrating an example of a placement policy table;

FIG. 5 is a diagram illustrating an example of an application management table;

FIG. 6 is a diagram illustrating an example of a storage management table;

DETAILED DESCRIPTION OF THE EMBODIMENT

Hereinafter, an embodiment of the present disclosure will be described with reference to the drawings. Note that the embodiment described below is not intended to limit the invention according to the scope of the claims, and all of the elements and combinations thereof described in the embodiment are not necessarily essential to the solution to the problems according to the invention.

In the following description, various kinds of information may be described using the expression "aaa table". However, the various kinds of information may be expressed by using a data structure other than a table. To indicate the non-dependency on the data structure, the "aaa table" may be referred to as "aaa information". In addition, in the following description, a term "program" may be used as a subject. However, since it is a processor (for example, a CPU (Central Processing Unit), a GPU (Graphics Processing Unit), or the like) that executes the program to perform predetermined processing while appropriately using a storage resource (for example, a memory), an interface device (for example, a communication device), or the like, the term "processor" may be used as the subject. Similarly, a subject of the processing performed by executing a program may be a controller, an apparatus, a system, a computer, a node, a storage apparatus, a server, a client, a host, or the like that includes a processor. A part or all of the program may be processed by using a specific hardware circuit. In addition, various programs may be installed in each computer by a program distribution server or a storage medium. In the following description, two or more programs may be implemented as one program, and conversely, one program may be implemented as two or more programs.

Further, in the following description, IDs are used as identification information about elements. However, other types of identification information may be used instead of or in addition to the IDs.

Figure 1:
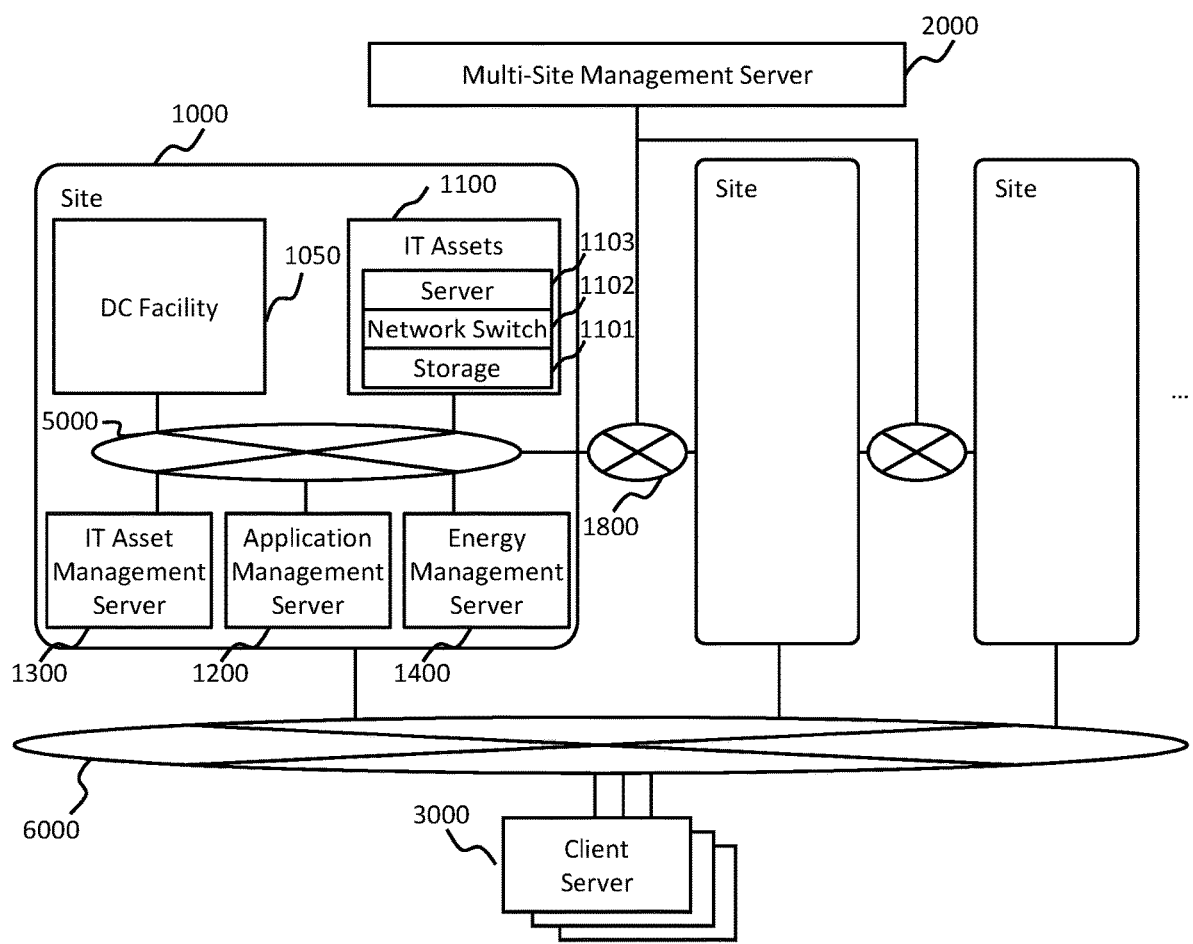
FIG. 1 is a diagram illustrating an overall configuration of a multi-site data center management system, which is a computer system, according to an embodiment of the present disclosure.

FIG. 1 is a diagram illustrating an overall configuration of a multi-site data center management system, which is a computer system, according to an embodiment of the present disclosure. The multi-site data center management system illustrated in FIG. 1 includes a plurality of sites (Sites) 1000, a multi-site management server (Multi-Site Management Server) 2000, and a client server (Client Server) 3000.

The individual site 1000 is a place where a DC (data center) is provided. The DC is a device group that stores data and executes an application for performing a workload (calculation processing) using the data. The sites 1000 are provided, for example, at geographically separated locations. Further, the single site 1000 may include a plurality of DCs. The sites 1000 or the DCs may each construct a different environment such as an on-premise environment, or a cloud environment such as a public cloud and a private cloud. That is, the present disclosure is appliable to a so-called hybrid cloud, which includes a plurality of cloud environments different from each other.

The multi-site management server 2000 is a site management apparatus (management computer) that manages, based on information about the DCs provided in the respective sites 1000, the execution of an application by each DC and setting of each apparatus. The multi-site management server 2000 is communicably connected to the DC included in each site 1000 via a wide area network 1800.

The client server 3000 is a client computer used by a user of the DC and is communicably connected to the DC included in each site 1000 via a client network 6000. For example, the client server 3000 transmits various instructions such as an execution instruction of an application to the DC and receives a response corresponding to the instruction from the DC.

Each site 1000 includes, as components constituting the DC, a DC facility 1050, IT assets 1100, an application management server 1200, an IT asset management server 1300, and an energy management server 1400, and these components are communicably connected to each other via a management network 5000.

The DC facility 1050 is a facility used for operating the DC and is, for example, an air conditioning facility, a backup power facility such as a UPS (Uninterruptible Power Supply), or the like.

The IT assets 1100 is a device constituting a DC main body and is a processing computer for storing data and executing a workload using the data. In the example of FIG. 1, the IT assets 1100 includes a storage (Storage) 1101 that stores data, a network switch (Network Switch) 1102 that manages communication of the data and the like, and a server (Server) 1103 that executes an application that performs a workload using the data.

The application management server 1200 is a management computer that manages an application executed by the server 1103 of the IT assets 1100 and acquires and stores application management information related to the application.

The IT asset management server 1300 is a management computer that manages the IT assets 1100 and acquires and stores IT asset information related to the IT assets 1100. The IT asset information is, for example, configuration information indicating a connection relationship of the individual IT assets 1100 and performance information indicating a use state of resources (a CPU, a network card, a disk, and the like) constituting the IT assets 1100.

The energy management server 1400 is a management computer that manages power consumption consumed by the DC and acquires and stores power information related to the power consumption. The power consumption of the DC includes not only power consumed by the IT assets 1100 but also power consumed by the DC facility 1050, etc.

In the present embodiment, the management computers (the application management server 1200, the IT asset management server 1300, and the energy management server 1400) are arranged in a distributed manner. However, any one of the management computers may be integrated with another management computer. In addition, while the multi-site management server 2000 in the present embodiment is provided independently of the sites 1000, the multi-site management server 2000 may be provided in any one of the sites 1000.

Figure 2:
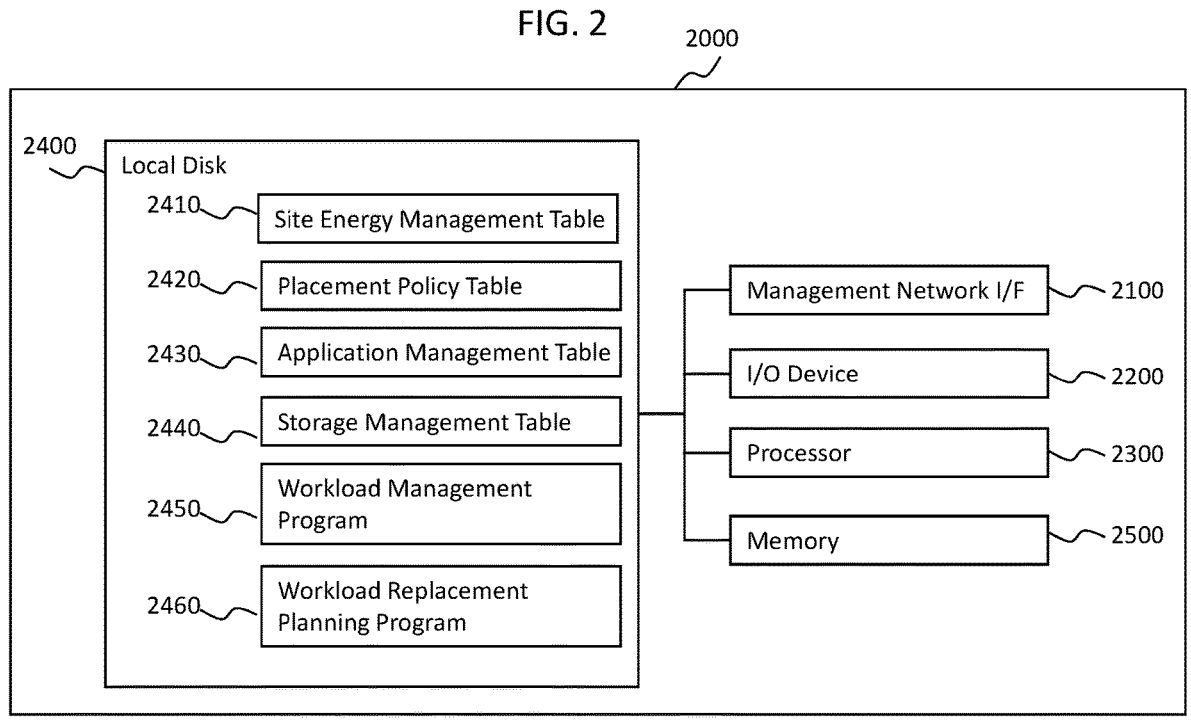
FIG. 2 is a diagram illustrating a configuration of a multi-site management server.

FIG. 2 is a diagram illustrating a configuration of the multi-site management server 2000. As illustrated in FIG. 2, the multi-site management server 2000 includes a management network I/F (Management Network Interface) 2100, an input and output device (IC Device) 2200, a processor (Processor) 2300, a local disk (Local Disk) 2400, and a memory (Memory) 2500.

The management network I/F 2100 is communicably connected to the devices in each site 1000 illustrated in FIG. 1. The I/O device 2200 is a user interface, such as a monitor, a keyboard, and a mouse, for a user to input and output information.

The processor 2300 is a processing unit that performs various kinds of processing by loading programs into the memory 2500 and executing the programs. The local disk 2400 is a storage device that stores programs that define the operations of the processor 2300 and various kinds of information used or generated in the processing based on the programs. The memory 2500 is a main storage device that temporarily stores various kinds of information and is used as a work area of the programs.

The local disk 2400 stores, as information, a site energy management table (Site Energy Management Table) 2410, a placement policy table (Placement Policy Table) 2420, an application management table (Application Management Table) 2430, and a storage management table (Storage Management Table) 2440. In addition, the local disk 2400 stores, as programs, a workload replacement planning program (Workload Replacement Planning Program) 2450 and a workload management program (Workload Management Program) 2460.

The site energy management table 2410, the placement policy table 2420, the application management table 2430, and the storage management table 2440 are loaded into the memory 2500 and used by the workload replacement planning program 2450 and the workload management program 2460.

The site energy management table 2410 is energy management information including power demand information related to power demand at a specific time in a specific site 1000. The multi-site management server 2000 retrieves at least a part of the power information stored in the energy management server 1400 and manages the retrieved power information as the site energy management table 2410. The power demand information includes power price information. In addition, the power demand information includes not only a result value related to the power demand but also a forecast value related to the power demand. Note that a method for creating the site energy management table 2410 is not particularly limited. For example, the forecast value may be retrieved from the energy management server 1400 or may be calculated from the result value or the like in the multi-site management server 2000.

The placement policy table 2420, the application management table 2430, and the storage management table 2440 constitute workload management information for managing the workloads of the DCs.

The placement policy table 2420 includes placement policy information indicating placement policies, which are policies related to workload migration (relocation). In the present embodiment, the workload migration is performed by migrating an application, more specifically, by migrating an execution site, which is the site 1000 in which the application is executed. A method for creating the placement policy table 2420 is not particularly limited. For example, the placement policy table 2420 may be created by the multi-site management server 2000 or may be created by another computer such as the IT asset management server 1300.

The application management table 2430 includes application information, which is information related to applications executed by the server 1103 of the IT assets 1100. The multi-site management server 2000 retrieves at least a part of the application management information stored in the application management server 1200 and manages the retrieved application management information as the application management table 2430.

The storage management table 2440 includes storage information related to the storage 1101 that stores data used by the applications. The storage information includes information retrieved from the IT asset management server 1300 by the multi-site management server 2000. Alternatively, the storage information may be created with data retrieved from another management computer.

The workload replacement planning program 2450 is a program for creating migration plan information indicating a migration plan of a workload based on a request from the workload management program 2460. The migration plan indicates, for example, a migration target application, which is an application that executes a migration target workload, which is a workload to be migrated, and the site 1000 to be a migration destination of the migration target application.

The workload management program 2460 is a program for managing execution of a workload. For example, the workload management program 2460 requests the workload replacement planning program 2450 to create migration plan information at a predetermined timing and performs the migration of the workload based on the migration plan information from the workload replacement planning program 2450. The migration of the workload is performed by migrating the application that performs the workload. In the migration of the workload, when the application uses a data area of the storage 1101, the data in the data area is migrated (copied) in conjunction with the application.

FIG. 3 is a diagram illustrating an example of the site energy management table 2410. The site energy management table 2410 includes columns 2411 to 2418. A record of the site energy management table 2410 indicates power to demand information related to power demand at a specific time in a specific site 1000.

The column 2411 stores a site ID (Site ID), which is identification information for identifying the site 1000. The column 2412 stores a time stamp (Time) indicating a time. The column 2413 stores a renewable energy supply forecast (RE Supply Forecast), which is a forecast value of a supply amount of power generated by renewable energy, for the corresponding site (the site 1000 of the site ID in the same record) at the corresponding time (the time indicated by the time stamp in the same record). The column 2414 stores a renewable energy supply result (RE Supply Result), which is a result value of a supply amount of power generated by renewable energy at the corresponding site and time. The column 2415 stores a renewable energy price (RE Price Forecast), which is the price of power generated by renewable energy at the corresponding site and time. The column 2416 stores a non-renewable energy price (GRID Price Forecast), which is the price of power generated by non-renewable energy at the corresponding site and time. The column 2417 stores a power demand forecast (Power Demand Forecast), which is a forecast value of a power demand amount, that is, an amount of power demanded for the corresponding site and time. The column 2418 stores a result value of the power demand amount (Power Consumption Result) at the corresponding site and time. Note that the renewable energy supply forecast and the power demand forecast indicate a supply amount and a demand amount that has been forecasted for the corresponding time prior to the corresponding time.

Records 241A to 241D of the site energy management table 2410 each indicate time-series power demand information about the corresponding one of the sites 1000. For example, the record 241A indicates that, for a site of the site ID "01" at the time of "2018/4/1/10:00", the renewable energy supply forecast is 3.0 MW, the renewable energy supply result is 2.5 MW, the renewable energy price forecast is 30 yen/kWh, the non-renewable energy price forecast is 25 yen/kWh, the power demand forecast is 10.1 MW, and the power consumption result is 10.9 MW. As with the records 241C and 241D, when the data in the columns 2414 and 2418 represents "n/a", the record indicates the power to demand information at a future time point.

FIG. 4 is a diagram illustrating an example of the placement policy table 2420. The placement policy table 2420 illustrated in FIG. 4 includes columns 2421 to 2423.

The column 2421 stores a policy ID (Policy ID) for identifying a placement policy. The column 2422 stores a site ID of the site 1000 in which the application can be placed in accordance with the corresponding placement policy (the placement policy of the policy ID in the same record). The column 2423 stores migration determination information (Migration) indicating whether the application is allowed to migrate between the sites 1000 in the placement policy. In the present embodiment, the migration determination information indicates "True" when the migration is allowed and indicates "False" when the migration is not allowed.

Records 242A to 242E of the placement policy table 2420 each indicate application placement policy information. For example, the record 242A indicates that a placement policy of the policy ID "01" allows the application to be placed in any of the sites 1000 of the site IDs "01" and "02" and that migration between these sites 1000 is allowed. Similarly, the record 242D indicates that a placement policy of the policy ID "04" allows the application to be placed in any of the sites 1000 of the site IDs "01" and "02" and that migration between these sites 1000 is not allowed.

FIG. 5 is a diagram illustrating an example of the application management table 2430. The application management table 2430 illustrated in FIG. 5 includes columns 2431 to 2436.

The column 2431 stores an application ID (App ID), which is identification information for identifying an application. The column 2432 stores a site ID of an execution site, which is the site 1000 that executes the corresponding application (the application of the application ID in the same record). The column 2433 stores estimated power consumption (Estimated Power Consumption), which is an estimated value of power consumption, that is, an amount of power consumed by the corresponding application. The column 2434 stores storage configuration information (Storage Configuration) indicating a configuration of the storage 1101 used by the corresponding application. The column 2435 stores a creation time (Creation Time) at which the corresponding application has been deployed. The creation time may be a time at which the application has actually been deployed to the corresponding site, or when the application has been migrated from another site 1000, the creation time at the previous site 1000 prior to the migration may be taken over. The column 2436 stores a policy ID of a placement policy for the corresponding application.

The storage configuration indicates whether a volume is allocated to the application (that is, whether there is data used by the application) and whether the data is copied. Specifically, the storage configuration information indicates "No Volume" when no volume is allocated to the application and indicates "Allocated" when a volume is allocated to the application. In addition, the storage configuration information indicates "Allocated and Copied for Migration" when a volume is allocated to the application and data is copied for migration of the application and indicates "Allocated and Copied for DR" when a volume is allocated to the application and data is copied for disaster recovery of the application. Note that the data may be copied for other purposes such as backup.

Records 243A to 243D of the application management table 2430 each indicate application information. For example, the record 243A indicates that an application of the application ID "01" is executed in the site of the site ID "01", the estimated power consumption is "30 wh", and a volume, which is a storage area, is not allocated to the application. The record 243A also indicates that the application has been executed since "2018/4/1/10:00" and complies with the placement policy of the policy ID "01".

FIG. 6 is a diagram illustrating an example of the storage management table 2440. The storage management table 2440 illustrated in FIG. 6 includes columns 2441 to 2449.

The column 2441 stores a volume ID (Volume ID), which is identification information for identifying a volume. The column 2442 stores an application ID of an application to which the corresponding volume (the volume of the volume ID in the same record) is allocated. The column 2443 stores a copy flag (Copy Flag) indicating whether data of the corresponding volume is in a copy state to be copied to another volume. In the present embodiment, the copy flag indicates "True" when the data is in a copy state and indicates "False" when the data is not in a copy state. The column 2444 stores a copy pair ID (Copy Pair ID), which is identification information for identifying a copy pair of the corresponding volume. The copy pair is a combination of a copy source and a copy destination of the volume in the copy state, and the copy pair ID indicates "n/a" when the volume is not in the copy state. The column 2445 stores a type (Type) of the volume in the copy pair. The type indicates "Primary" when the corresponding volume is a primary volume, which is a copy source, and indicates "Secondary" when the corresponding volume is a secondary volume, which is a copy destination. The column 2446 stores a capacity (Capacity) of the corresponding volume. The column 2447 stores a used capacity (Used Capacity) of the corresponding volume. The total sum of the used capacities of the volume allocated to the application is the amount of data used by the application. The column 2448 stores a device type (Device Type), which is a type of device (storage 1101) to which the corresponding volume is allocated. The column 2449 stores a site ID of the site 1000 that includes the corresponding volume.

Records 244A to 244E of the storage management table 2440 each indicate storage information. For example, the record 244A indicates that a volume of the volume ID "01" is allocated to the application of the application ID "02", and this volume is in a copy state, has a copy pair ID "01", and is a primary volume. The record 244A also indicates that the capacity of the volume is "500 GB", and "110 GB" out of "500 GB" has been used. The record 244A further indicates that the device type is "A", and the volume is provided in the site 1000 of the site ID "01". The volumes corresponding to the records 244A and 244B form a copy pair. The record 244E indicates a volume that does not form a copy pair.

Note that the storage configuration information stored in the column 2434 of the application management table 2430 and the storage management table 2440 constitute data management information related to the data used by the application.

Hereinafter, migration plan creation processing by the workload replacement planning program 2450 will be described in more detail. The migration plan creation processing creates migration plan information based on the site energy management table 2410, the placement policy table 2420, the application management table 2430, and the storage management table 2440.

Figure 7:
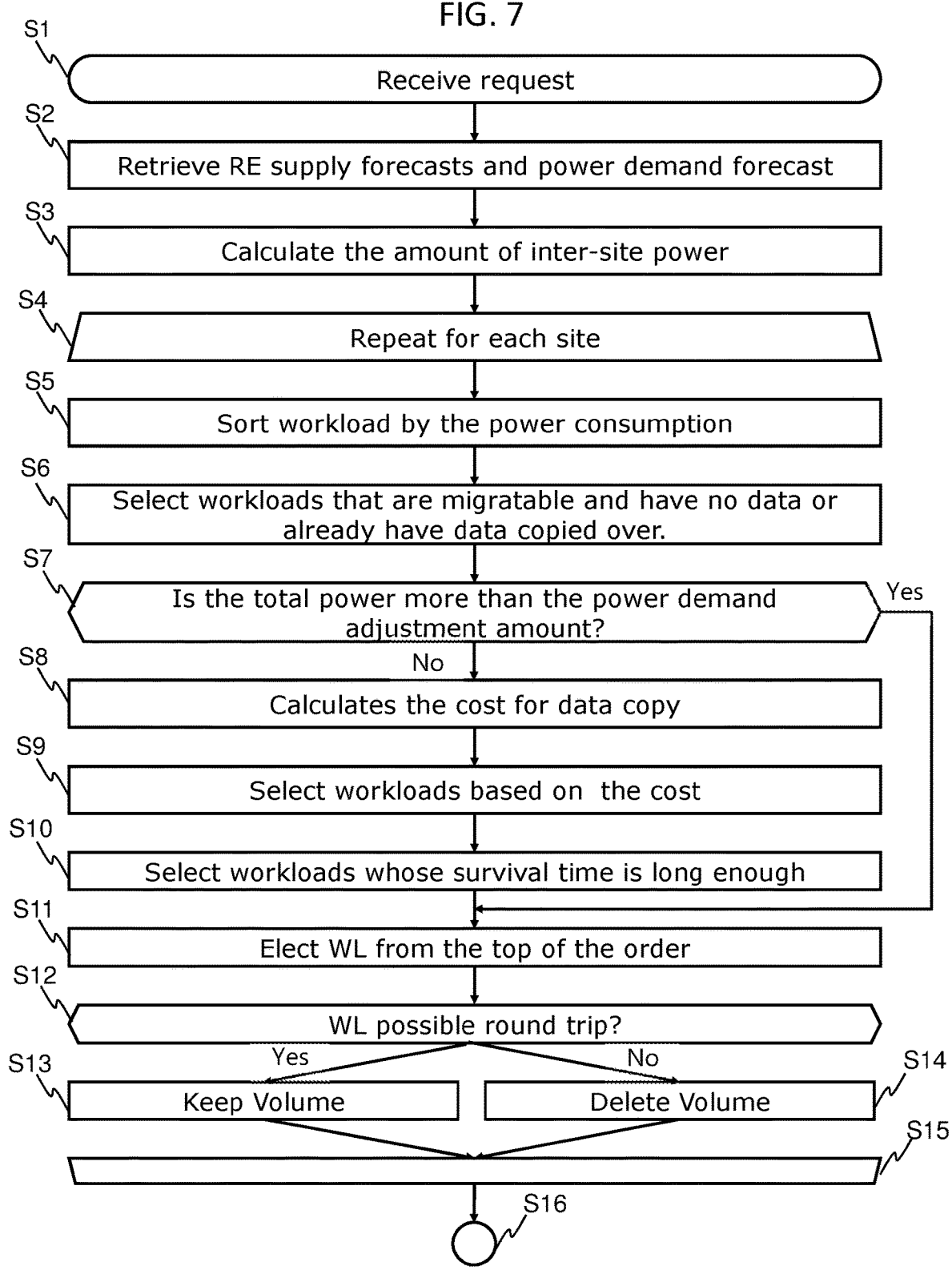
FIG. 7 is a flowchart for describing an example of migration plan creation processing.

FIG. 7 is a flowchart for describing an example of the migration plan creation processing.

In step S1, the workload replacement planning program 2450 receives a request to create migration plan information from the workload management program 2460 and starts the following processing.

In step S2, the workload replacement planning program 2450 retrieves a renewable energy supply forecast and a power demand forecast for each time at each site 1000 from the site energy management table 2410.

In step S3, the workload replacement planning program 2450 calculates an adjustment amount for adjusting the power demand amount consumed at each site 1000 at predetermined intervals in a predetermined time period based on the renewable energy supply forecast and the power demand forecast retrieved in step S2 and the placement policy table 2420. The adjustment of the power demand amount is performed by relocating the workload as will be described below. In the present embodiment, the predetermined interval is set to one hour, which is a time interval of the time stamp in the site energy management table 2410 illustrated in FIG. 3. However, the predetermined interval is not limited to this example. The time interval may be one day, for example.

In the calculation of the adjustment amount, when the connection relationship between the sites 1000 is one-to-one, first, the workload replacement planning program 2450 calculates a value obtained by subtracting the power demand forecast PDFt from the renewable energy supply forecast RSFt (RSFt−PDFt) in each site 1000, as a surplus amount of the renewable energy supply amount, which is a supply amount of power generated by renewable energy. Hereinafter, the surplus amount of the renewable energy supply amount will be referred to as a renewable energy surplus amount. When the renewable energy surplus amount is a negative value, the absolute value of the renewable energy surplus amount may be referred to as a shortage amount.

When the renewable energy surplus amount of one site 1000 is a negative value and the renewable energy surplus amount of the other site 1000 is a positive value, the workload replacement planning program 2450 determines that the renewable energy supply amount is insufficient in the other site 1000. In this case, the workload replacement planning program 2450 sets the one site 1000 as a migration source site (first site) and sets the other site 1000 as a migration destination site (second site). When the renewable energy surplus amount in the migration source site is larger than the shortage amount of the renewable energy supply amount in the migration destination site, the workload replacement planning program 2450 sets the shortage amount as the adjustment amount, and when the renewable energy surplus amount in the migration source site is smaller than the shortage amount of the renewable energy supply amount in the migration destination site, the workload replacement planning program 2450 sets the renewable energy surplus amount as the adjustment amount.

Similarly, when the connection relationship between the sites 1000 is n to n, the workload replacement planning program 2450 sets the site 1000 with a negative renewable energy surplus amount as a migration source site and sets the site 1000 with a positive renewable energy surplus amount as a migration destination site. In this case, the workload replacement planning program 2450 may set an adjustment amount of the migration source site with respect to each of the migration destination sites to a value obtained by equally dividing a shortage amount of the migration source site by the number of the migration destination sites or to a value depending on the renewable energy surplus amount of each of the migration destination sites.

In step S4, the workload replacement planning program 2450 starts loop processing in which processing of the following steps S5 to S14 is repeated for each combination of the sites between which the adjustment amount of power calculated in step S3 is adjusted.

In step S5, the workload replacement planning program 2450 sorts the records related to selection target applications, each of which is an application executed in the migration source site (the site with a negative renewable energy surplus amount), which is one of the combination of the sites, in descending order of estimated power consumption amounts of the respective selection target applications in the application management table 2430.

In step S6, the workload replacement planning program 2450 refers to the placement policy table 2420, the application management table 2430, and the storage management table 2440 and selects, from among the selection target applications, the application that is migratable and to which data is not allocated and the application that is migratable and whose data has already been copied to the migration destination site, as a candidate application, which is a candidate for the migration target application. Whether or not the application is migratable is determined based on the migration determination information stored in the column 2423 of the placement policy table 2420. Whether or not data is allocated is determined based on the storage configuration information stored in the column 2434 of the application management table 2430. Specifically, when the storage configuration information indicates "No Volume", it is determined that data is not allocated to the application, and otherwise, it is determined that data is allocated to the application. Whether or not the data has been copied is determined based on whether a copy destination site is the migration destination site. The copy destination site is the site of the site ID corresponding to the volume whose type stored in the column 2445 of the storage management table 2440 indicates "Secondary". When the copy destination site is the migration destination site, a copy of the data is already stored in the migration destination site.

In step S7, the workload replacement planning program 2450 refers to the application management table 2430, calculates the total of power consumption of the candidate applications selected in step S6, and determines whether the total value is equal to or more than the adjustment amount calculated in step S3. If the total value is equal to or more than the adjustment amount (step S7: Yes), the processing of the workload replacement planning program 2450 proceeds to step S11, and if the total value is less than the adjustment amount (steps S7: No), the processing proceeds to step S8.

In step S8, the workload replacement planning program 2450 refers to the application management table 2430 and specifies, from among the selection target applications, the application which is migratable, to which data is allocated, and which has the data that has not yet been copied to the migration destination site. The workload replacement planning program 2450 calculates the copying cost, which is the cost of copying the data allocated to the specified application to the migration destination site, based on the storage management table 2440. The copying cost is a value calculated based on the used capacity stored in the column 2447 of the storage management table 2440, that is, the data amount. For example, the copying cost is at least one of the power consumption and time needed for copying. The workload replacement planning program 2450 refers to, for example, the device type of the migration destination site stored in the column 2448 of the storage management table 2440 and calculates the copying cost from the data amount by using a calculation formula predetermined for each device type. However, the method for calculating the cost is not limited to this method.

In step S9, the workload replacement planning program 2450 selects, from among the applications specified in step S8, the application whose copying cost satisfies a predetermined criterion as a candidate application. For example, the criterion is that the cost is equal to or smaller than a threshold. The threshold may be a fixed value or a variable value. The variable threshold is, for example, a proportion with respect to a varying reference value. For example, the threshold of the copying power consumption may be set to 5% of the adjustment amount, and the threshold of the copying time may be set to 10% of the time until a scheduled migration time. In addition, the workload replacement planning program 2450 may select the application having at least one of the copying power consumption and the copying time equal to or smaller than the threshold or may select the application having both the copying power consumption and the copying time equal to or smaller than the threshold.

In step S10, the workload replacement planning program 2450 refers to the application management table 2430 and selects, from among the applications specified in step S8, the application whose survival time, which is a time period during which the application is continuously executed, is longer than a reference time period as a candidate application. For example, the reference time period may be a fixed value such as 24 hours, or may be a variable value.

In step S11, the workload replacement planning program 2450 determines the candidate application as the migration target application in order from the top record sorted in step S5 (that is, in descending order from the application having the largest power consumption) until the total power consumption of the selected applications reaches the adjustment amount determined in step S3.

In step S12, based on the site energy management table 2410, the workload replacement planning program 2450 predicts whether the migration target application is likely to be returned (relocated) from the second site, which is the migration destination site, to the first site, which is the migration source site, within a predetermined time period after a scheduled time at which the migration target application is to be migrated. For example, the workload replacement planning program 2450 calculates an adjustment amount between a combination of sites 1000, as performed in step S3, for a time within the predetermined time period, and based on the calculated adjustment amount, the workload replacement planning program 2450 determines whether the application is to be migrated between the same combination of sites 1000 from the second site to the first site. For example, the application of 100 kW is migrated from the first site to the second site in one hour, and when it is determined that the application of 500 kW is to be further migrated from the second site to the first site in 10 hours, the workload replacement planning program 2450 predicts that the application is likely to be returned.

If the workload replacement planning program 2450 predicts that the application is likely to be returned (step S12: Yes), the processing proceeds to step S13, and if the workload replacement planning program 2450 predicts that the application is unlikely to be returned (step S12: No), the processing proceeds to step S14.

In step S13, the workload replacement planning program 2450 formulates a deletion policy not to delete the volume at the migration source site when the data is copied for the migration of the application.

In step S14, the workload replacement planning program 2450 formulates a deletion policy to delete the volume at the migration source site when the data is copied for the migration of the application.

When the processing of steps S5 to S14 has been performed on all the sites 1000, the workload replacement planning program 2450 ends the loop processing in step S15.

Further, in step S16, the workload replacement planning program 2450 returns the migration plan information that includes the migration target application, the migration destination site of the migration target application, and the deletion policies to the workload management program 2460 and ends the processing.

In the above-described processing, in step S1, upon receiving the instruction from the workload management program 2460, the workload replacement planning program 2450 starts the subsequent processing. Alternatively, the workload replacement planning program 2450 may generate a list of migration target applications in advance by executing the processing of steps S2 to S11 in advance. In this case, upon receiving the instruction from the workload management program 2460, the workload replacement planning program 2450 may return the migration plan information to the workload management program 2460 based on the list.

In the above-described processing, only a site having a positive renewable energy surplus amount is set as a migration destination site. However, there is a case where even a site having a negative renewable energy surplus amount provides another site with power generated by renewable energy in consideration of an economic advantage. In such a case, the site having the negative renewable energy surplus amount may be set as a migration destination site. In this case, for example, information indicating whether or not to provide power generated by renewable energy is added to the site energy management table 2410 for each site, and the workload replacement planning program 2450 selects the migration destination site based on this information.

All of the above-described processing does not necessarily need to be performed, and the above-described processing may be omitted as appropriate. For example, the processing of step S10 may be omitted.

In addition, upon receiving the migration plan information from the workload replacement planning program 2450, the workload management program 2460 presents the migration plan information to the user. When the user instructs the immigration of the application in accordance with the migration plan information, the workload management program 2460 instructs each site 1000 to migrate the migration target application in accordance with the migration plan information. In this processing, the workload management program 2460 transmits an instruction to delete the volume to the migration source site of the migration target application having the deletion policy to delete the volume in the migration plan information and deletes the volume after the data has been copied. On the other hand, the workload management program 2460 does not transmit an instruction to delete the volume to the migration source site of the migration target application having the deletion policy not to delete the volume and keeps the volume even after the data has been copied. Note that, when the volume is deleted, the data allocated to the volume is also deleted.

Figure 8:
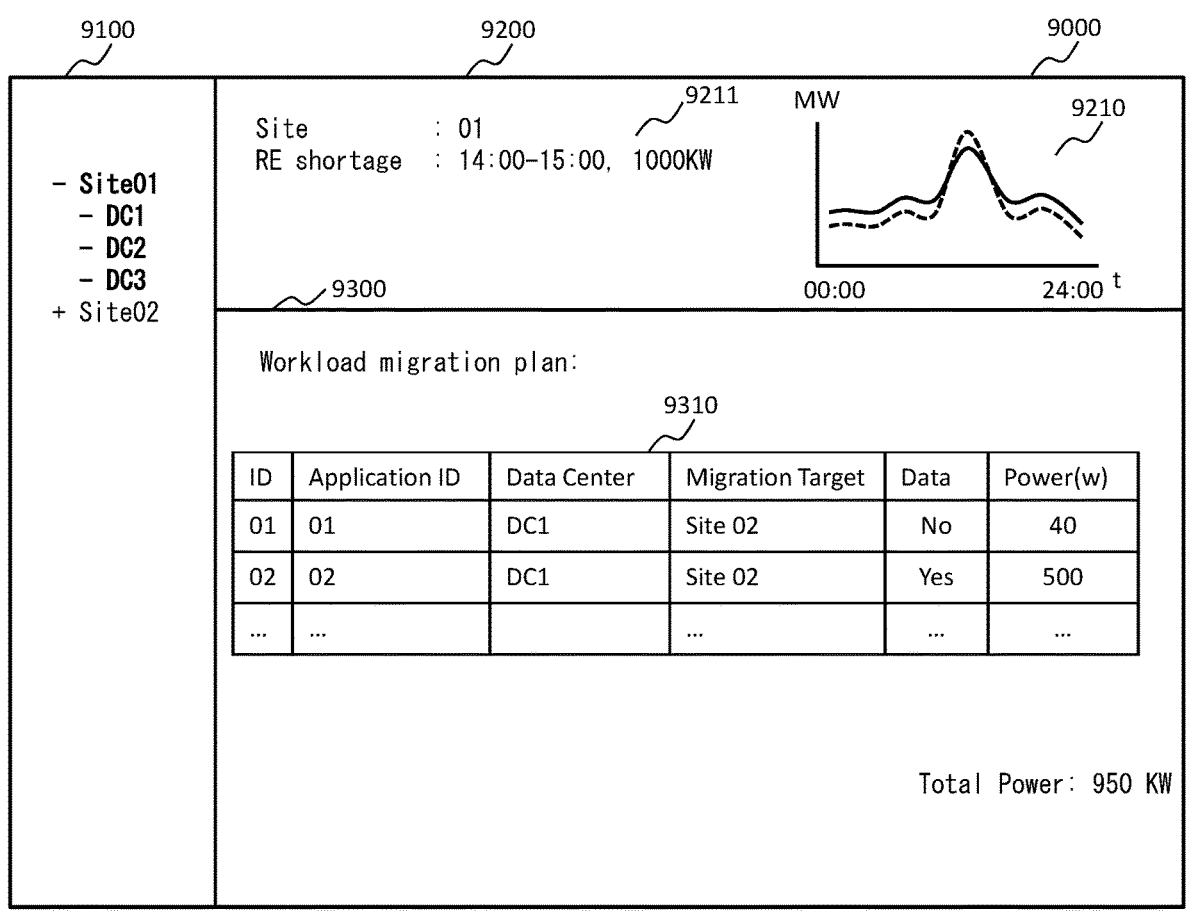
FIG. 8 is a diagram illustrating an example of an interface for presenting migration plan information.

FIG. 8 is a diagram illustrating an example of a GUI (Graphical User Interface), which is an interface for the workload management program 2460 to present the migration plan information to the user. A GUI 9000 illustrated in FIG. 8 is presented to the user of the DC, for example.

The GUI 9000 includes display units 9100, 9200, and 9300. The display unit 9100 displays a list of configurations of the DCs and the sites 1000 managed by the user. In the example in FIG. 8, the display unit 9100 indicates that there are a site "01" and a site "02" and the site "01" includes data centers "DC1", "DC2", and "DC3".

The display unit 9200 displays the chart 9210 indicating a renewable energy supply forecast and a power demand forecast obtained for a target time period (in FIG. 8, one day) for the site selected on the display unit 9100. In the chart 9210, the power demand forecast is indicated by a dashed line, and the renewable energy supply forecast is indicated by a solid line. In addition, on the left side of the chart 9210, the display unit 9100 displays shortage information 9211 indicating a time period during which the renewable energy supply forecast falls short of the power demand forecast and the shortage amount.

The display 9300 displays migration plan information for solving the shortage of power generated by renewable energy.

As described above, according to the present embodiment, the site energy management table 2410 indicates, for each site 1000, a renewable energy supply forecast, which is a forecast value of a supply amount of power generated by renewable energy and supplied to the site 1000, and a power demand forecast, which is a forecast value of a demand amount of power consumed by the site 1000. The workload management information (the placement policy table 2420, the application management table 2430, and the storage management table 2440) indicates, for each workload, a power consumption amount, which is an amount of power consumed by the workload, data management information related to the data used by the workload, and an execution site, which is the site 1000 at which the workload is executed. The workload replacement planning program 2450 calculates, based on the site energy management table 2410, an adjustment amount for adjusting the demand amount consumed at a migration source site of the workload. The workload replacement planning program 2450 selects, based on the adjustment amount and the workload management information, a migration target workload, which is a workload whose execution site is to be migrated to a migration destination site, from among workloads executed in the migration source site, and generates migration plan information indicating the migration target workload. In this way, the migration plan information can be generated in consideration of the information related to the data used in the application, and this can minimize various problems associated with the migration of the site such as overhead of power consumption. Therefore, it is possible to achieve both the improvement of the utilization rate of renewable energy and the reduction of the overhead of power consumption. As a result, it is possible to reduce the power consumption in the workload control in consideration of renewable energy for the purpose of reducing the $CO_2$ emission amount and reduce the application exhibiting deterioration in service level.

In the present embodiment, the workload replacement planning program 2450 selects, based on the workload management information, a candidate workload to be a candidate for the migration target workload and selects, as the migration target workload, the candidate workload in descending order of the power consumption amount consumed by the candidate workload until a total of the power consumption amounts reaches the adjustment amount. In this way, the migration target workload can be selected such that the number of workloads to be migrated is minimized, and this can reduce the number of workloads (applications) that are stopped for the migration. Therefore, it is possible to more appropriately achieve both the improvement of the utilization rate of renewable energy and the reduction of the overhead of power consumption.

In the present embodiment, the workload replacement planning program 2450 selects, as the candidate workload, the workload whose copy destination site to which the data is copied is the migration destination site. This eliminates the need for copying the data for the migration of the workload, and thus, it is possible to minimize the problem in that the migration (copying) of the data fails.

In the present embodiment, the workload replacement planning program 2450 selects, as the candidate workload, the workload having no data to be used. This eliminates the need for copying the data for the migration of the workload, and thus, it is possible to further reduce the overhead of power consumption.

In the present embodiment, the workload replacement planning program 2450 selects, as a candidate workload, a workload whose cost (for example, an amount of power and time) for copying the data to the migration destination site is equal to or smaller than a threshold. As a result, the workload whose cost for the migration is low can be selected as the candidate workload, and thus, it is possible to further reduce the overhead of power consumption.

In the present embodiment, the workload replacement planning program 2450 selects, as the candidate workload, the workload whose survival time during which the workload is continuously executed is equal to or longer than a reference time period. In this way, it is possible to prevent the cost for the migration from being wastefully consumed by the workload that has a short survival time and is deleted immediately after being migrated.

When it is predicted that the workload is likely to be returned from the migration destination site to the migration source site, the workload replacement planning program 2450 keeps the data in the migration destination site without deleting the data. This can eliminate or reduce the need for copying the data when the workload returns, and thus, it is possible to further reduce the overhead of power consumption.

The embodiment of the present disclosure described above is an example for describing the present disclosure and is not intended to limit the scope of the present disclosure only to the embodiment. Those skilled in the art can implement the present disclosure in other various forms without departing from the scope of the present disclosure.

What is claimed is:

1. A site management apparatus that manages a plurality of sites, including an on-premise data center infrastructure and cloud providers, each capable of storing data and executing a workload being a computer workload using the data to improve the utilization rate of renewable energy and reduction of overhead pursuant to a workload migration, the site management apparatus comprising:

a processor; and a memory, wherein the memory stores energy management information that indicates, for each site, a forecast value of a supply amount, which is an amount of power generated by renewable energy and supplied to the site, and a forecast value of a demand amount, which is an amount of power consumed at the site, and workload management information that indicates, for each workload, a power consumption amount, which is an amount of power consumed by the workload, data management information related to the data used by the workload, and an execution site, which is the site at which the workload is executed, and wherein the processor is configured to calculate, based on the energy management information, an adjustment amount for adjusting the demand amount consumed at a first site by migrating the execution site from the first site to a second site, select, based on the adjustment amount and the workload management information, a migration target workload, which is a workload whose execution site is to be migrated to the second site, from among workloads executed in the first site, and generate migration plan information indicating the migration target workload.

2. The site management apparatus according to claim 1, wherein the processor is further configured to select, based on the workload management information, a candidate workload to be a candidate for the migration target workload and select, as the migration target workload, the candidate workload in descending order of the power consumption amount consumed by the candidate workload until a total of the power consumption amounts reaches the adjustment amount.

3. The site management apparatus according to claim 2, wherein
the data management information indicates a copy destination site that is the site in which a copy of the data is stored, and
the processor is further configured to select, as the candidate workload, the workload whose copy destination site is the second site.

4. The site management apparatus according to claim 2, wherein
the data management information indicates a presence or an absence of the data, and
the processor is further configured to select, as the candidate workload, the workload without the data.

5. The site management apparatus according to claim 2, wherein
the data management information indicates a data amount of the data, and
the processor is further configured to calculate, based on the data amount, a cost for copying the data from the first site to the second site and select, as the candidate workload, the workload whose cost is equal to or smaller than a threshold.

6. The site management apparatus according to claim 5, wherein the cost is at least one of an amount of power and time.

7. The site management apparatus according to claim 2, wherein
the workload management information further indicates survival time, which is a time period during which the workload is continuously executed, and
the processor is further configured to select, as the candidate workload, the workload whose survival time is equal to or longer than a reference time period.

8. The site management apparatus according to claim 1, wherein the processor is further configured to:
generate the migration plan information at a predetermined time, predict, based on the energy management information, whether the execution site is likely to be returned from the second site to the first site within a predetermined time period after the predetermined time,
maintain, when the processor predicts that the execution site is likely to be returned, the data stored in the first site upon migrating the execution site based on the migration plan information, and
delete, when the processor predicts that the execution site is unlikely to be returned, the data stored in the first site upon migrating the execution site based on the migration plan information.

9. A management method performed by a site management apparatus that manages a plurality of sites, including on-premise data center infrastructures and cloud providers, each capable of storing data and executing a workload being a computer workload using the data to improve the utilization rate of renewable energy and reduction of overhead pursuant to a workload migration and that includes a processor and a memory, the management method comprising:
causing the memory to store energy management information that indicates, for each site, a forecast value of a supply amount, which is an amount of power generated by renewable energy and supplied to the site, and a forecast value of a demand amount, which is an amount of power consumed at the site, and workload management information that indicates, for each workload, a power consumption amount, which is an amount of power consumed by the workload, data management information related to the data used by the workload, and an execution site, which is the site at which the workload is executed; and
causing the processor to calculate, based on the energy management information, an adjustment amount for adjusting the demand amount consumed at a first site by migrating the execution site from the first site to a second site, to select, based on the adjustment amount and the workload management information, a migration target workload, which is a workload whose execution site is to be migrated to the second site, from among workloads executed in the first site, and to generate migration plan information indicating the migration target workload.

* * * * *